United States Patent [19]
Hartman et al.

[11] Patent Number: 5,335,300
[45] Date of Patent: Aug. 2, 1994

[54] METHOD OF MANUFACTURING I/O NODE IN AN OPTICAL CHANNEL WAVEGUIDE AND APPARATUS FOR UTILIZING

[75] Inventors: Davis H. Hartman, Phoenix; Fred V. Richard, Scottsdale; Michael S. Lebby, Apache Junction, all of Ariz.

[73] Assignee: Motorola, Inc., Schaumburg, Ill.

[21] Appl. No.: 994,235

[22] Filed: Dec. 21, 1992

[51] Int. Cl.$^5$ .............................. G02B 6/34
[52] U.S. Cl. .................... 385/37; 264/1.27; 264/1.31; 359/15; 359/34; 385/24; 385/132; 430/1; 430/290; 430/321
[58] Field of Search ............ 264/1.5; 359/3, 15, 359/19, 34; 385/14, 24, 37, 132, 141, 142, 143; 430/1, 2, 290, 321

[56] References Cited

U.S. PATENT DOCUMENTS

| | | | |
|---|---|---|---|
| 4,776,661 | 10/1988 | Handa | 385/24 X |
| 4,852,960 | 8/1989 | Alferness et al. | 385/37 |
| 4,935,930 | 6/1990 | Handa | 385/37 X |
| 5,061,027 | 10/1991 | Richard | 385/14 |
| 5,064,264 | 11/1991 | Ducharme et al. | 385/141 X |
| 5,098,804 | 3/1992 | Booth | 430/1 |
| 5,101,460 | 3/1992 | Richard | 385/37 |

*Primary Examiner*—John D. Lee
*Attorney, Agent, or Firm*—Eugene A. Parsons

[57] ABSTRACT

A method of manufacturing a molded optical channel waveguide, having a critical internal reflection angle and an exposed surface, and affixing a holographic layer, having gratings formed therein, in overlying relationship with the exposed surface of the optical waveguide. The gratings are positioned to form an angle with the surfaces of the holographic layer such that light rays incident on an upper surface of the holographic layer and substantially normal thereto are diffracted by the gratings into the optical waveguide. Also, light waves travelling within the waveguide emanate outwardly through the holographic layer. Light generators and detectors are mounted to supply light to and receive light from the holographic layer.

23 Claims, 3 Drawing Sheets

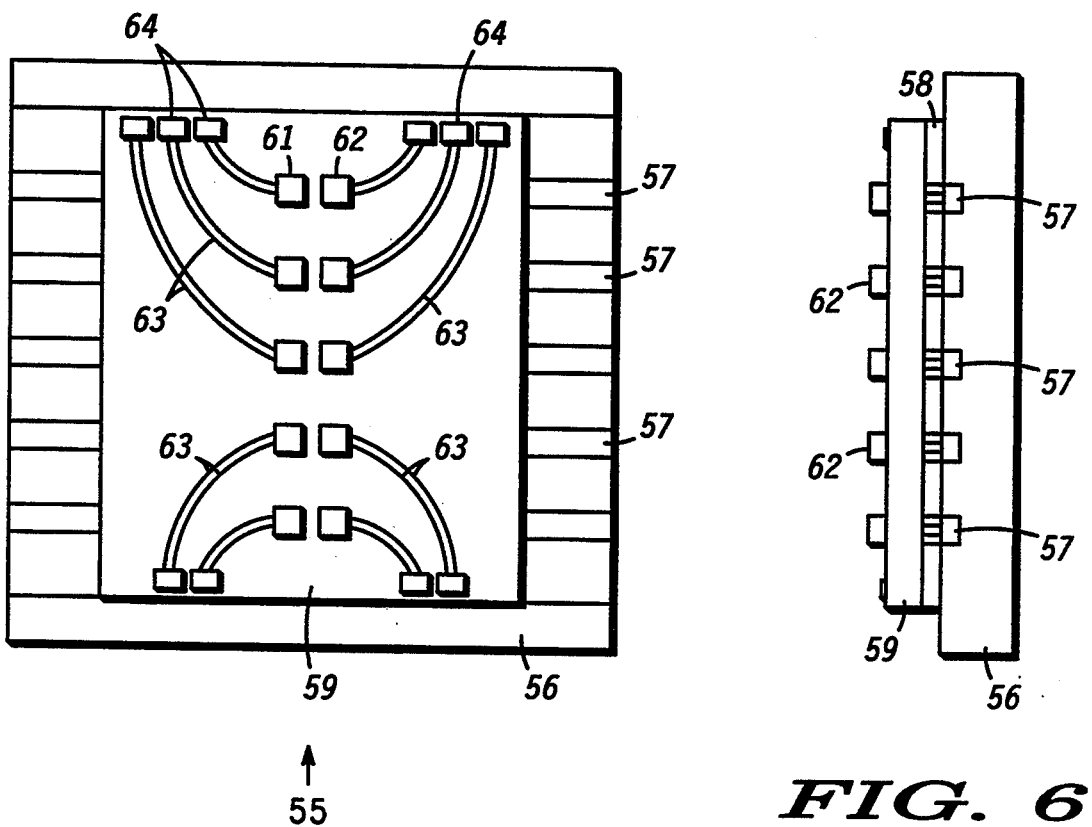
FIG. 5
FIG. 6
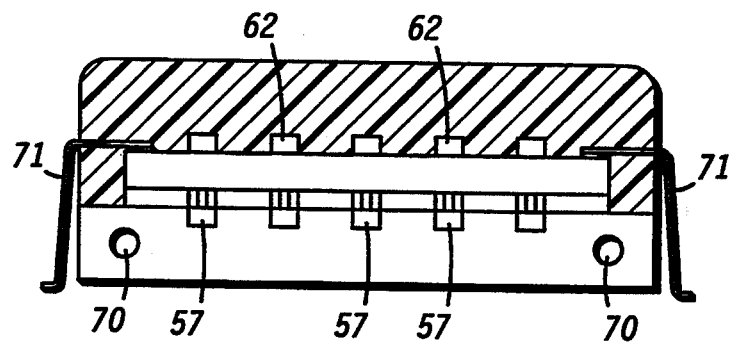
FIG. 7

METHOD OF MANUFACTURING I/O NODE IN AN OPTICAL CHANNEL WAVEGUIDE AND APPARATUS FOR UTILIZING

FIELD OF THE INVENTION

The present invention pertains to input/output nodes in optical channel waveguides and more specifically to methods of manufacturing the apparatus for introducing and/or extracting light waves from optical channel waveguides.

BACKGROUND OF THE INVENTION

In the electronic art it is becoming increasingly difficult to provide interconnections for circuit boards containing large scale chips and the like. For example, in computers and other high speed equipment, a backplane is often utilized for the interconnect and all individual boards plug into the backplane. The problems that arise in this type of interconnect is that bandwidth and speed is very limited.

Optical channel waveguides are capable of carrying large numbers of signals and have very broad bandwidths. However, it is very difficult and expensive to form input/output (I/O) connecters for optical channel waveguides and to assemble light generating and detecting components therewith. Also, for all connectors, except those introducing light rays at an end of the optical waveguide, the connections are large and inefficient.

SUMMARY OF THE INVENTION

It is a purpose of the present invention to provide new and improved apparatus for introducing and/or extracting light waves from optical waveguides and methods of manufacturing the apparatus.

It is a purpose of the present invention to provide new and improved apparatus utilizing I/O nodes for optical waveguides.

It is a further purpose of the present invention to provide new and improved apparatus utilizing I/O nodes for optical waveguides which is relatively simple and inexpensive to manufacture and use.

It is a further purpose of the present invention to provide new and improved apparatus utilizing I/O nodes for optical waveguides which is particularly adaptable to backplane and other buses in high speed electronic equipment.

The above problems and others and the above purposes and others are realized in a method of manufacturing apparatus incorporating an input/output node for optical waveguides comprising the steps of providing a first cladding layer having a first index of refraction, forming a channel in a surface of the first cladding layer, filling the channel with an optically transparent polymer having a second index of refraction at least 0.01 greater than the first index of refraction, the optically transparent polymer in the channel forming an optical waveguide having a critical internal reflection angle, forming, from an optically transparent material having an index of refraction substantially similar to the second index of refraction, a holographic layer with first and second substantially parallel, spaced apart optical input/output surfaces, forming in the holographic layer a plurality of gratings which extend substantially between the first and second optical input/output surfaces of the holographic layer, the plurality of gratings being positioned to form a predetermined angle with the first and second optical input/output surfaces of the holographic layer such that light rays incident on the second optical input/output surface of the holographic layer and substantially normal thereto are diffracted by the gratings at an angle, with a transverse axis of the holographic layer, greater than the critical angle of the optical waveguide, and affixing the holographic layer to the surface of the first cladding layer with the first optical input/output surface overlying an exposed surface of the optically transparent polymer.

The above problems and others and the above purposes and others are further realized in apparatus incorporating an input/output node for optical waveguides including an optical waveguide having a predetermined index of refraction with a critical internal reflection angle and an exposed surface, a holographic layer with first and second substantially parallel, spaced apart optical input/output surfaces, the holographic layer having a plurality of gratings formed therein so as to substantially extend between the first and second optical input/output surfaces of the holographic layer, and the first optical input/output surface being affixed in overlying relationship to the exposed surface of the optical waveguide, and the plurality of gratings being positioned to form an angle with the first and second optical input/output surfaces of the holographic layer such that light rays incident on the second optical input/output surface of the holographic layer and substantially normal thereto are diffracted by the gratings into the optical waveguide.

BRIEF DESCRIPTION OF THE DRAWINGS

Referring to the drawings:

FIG. 5 is a view in top plan of a plurality of nodes and apparatus utilizing the nodes similar to that illustrated in FIG. 3;

FIG. 6 is a view in end elevation of the nodes and apparatus illustrated in FIG. 5;

FIG. 7 is a view in end elevation of nodes and apparatus, similar to FIG. 6, with the structure formed into a complete unit in accordance with the present method.

DESCRIPTION OF THE PREFERRED EMBODIMENT

Figure 1:
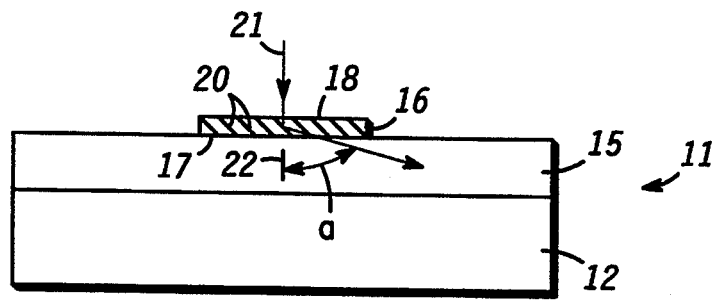
FIG. 1 illustrates, for purposes of explanation, a simplified I/O node for an optical waveguide.

Referring specifically to FIG. 1, a simplified input/output (I/O) node 10 is illustrated, for purposes of explanation. I/O Node 10 includes an optical channel waveguide 11. Waveguide 11 is formed by molding a first cladding layer 12 with a channel therein and, subsequently, filling the channel with an optically transparent material 15, which forms the light conducting core. Cladding layer 12 is molded for simplicity of construction, better control of the shape and size of the channel (core), and to simplify later steps in the construction of I/O node 10 (as will become apparent presently). Typically, the molded first cladding layer 12 and other layers affixed thereto are joined by optically transparent material 15 which forms the core of waveguide 11 and acts as an adhesive and an optically transparent polymer. Optically transparent material 15 generally may be any of several materials, such as epoxies, plastics, polyimides, or the like. Generally, refractive indexes of these optically transparent materials range from 1.54 to 1.58. It should be understood that to form an optical channel waveguide the refractive index of optically transparent material 15 must be at least 0.01 greater than the refractive index of cladding layer 12.

While the upper surface of optically transparent material 15 generally will be covered with a second cladding layer (not shown) affixed to first cladding layer 12 by some means, such as optically transparent material 15, at least a portion of the surface is exposed and a layer 16 of transmissive holographic material is affixed thereover. Holographic layer 16 has first and second substantially parallel, spaced apart optical input/output surfaces 17 and 18, respectively, with first optical input/output surface 17 being affixed in overlying relationship to the exposed surface of optical waveguide 11.

Holographic layer 16 has a plurality of gratings 20 formed therein so as to substantially extend between first and second optical input/output surfaces 17 and 18. The plurality of gratings 20 are positioned to form an angle with first and second optical input/output surfaces 17 and 18 of holographic layer 16 such that light rays 21 incident on second optical input/output surface 18 and substantially normal thereto are diffracted by gratings 20 into optical waveguide 11. Further, the light rays are diffracted into optical waveguide 11 at an angle "a", formed with a transverse axis 22 of optical waveguide 11, greater than the critical angle of optical waveguide 11. In the example of FIG. 1, gratings 20 only extend in one direction so that light rays 21 are only launched, or directed, into optical waveguide 11 to the right in FIG. 1.

Figure 2:
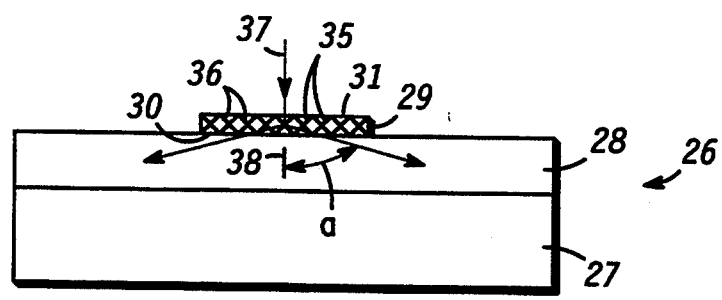
FIG. 2 illustrates, for purposes of explanation, a simplified bidirectional I/O node for an optical waveguide.

Referring specifically to FIG. 2, another simplified I/O node 25 is illustrated, for purposes of explanation. I/O Node 25 includes an optical waveguide 26. Waveguide 26 is formed by molding a first cladding layer 27 with a channel therein and, subsequently, filling the channel with an optically transparent material 28 to form the core. At least a portion of the upper surface of optical waveguide 26 is exposed and a layer 29 of transmissive holographic material is affixed thereover. Holographic layer 29 has first and second substantially parallel, spaced apart optical input/output surfaces 30 and 31, respectively, with first optical input/output surface 30 being affixed in overlying relationship to the exposed surface of optical waveguide 26. Holographic layer 29 has a first and a second plurality of gratings 35 and 36, respectively, formed therein so as to substantially extend between first and second optical input/output surfaces 30 and 31. Gratings 35 and 36 are positioned to form an angle with first and second optical input/output surfaces 30 and 31 of holographic layer 29 such that light rays 37 incident on second optical input/output surface 31 and substantially normal thereto are diffracted into optical waveguide 11 at an angle a, formed with a transverse axis 38 of optical waveguide 26, greater than the critical angle of optical waveguide 26. In the example of FIG. 2, gratings 35 and 36 extend in opposite directions so that light rays 37 are launched into optical waveguide 26 in both directions.

Figure 3:
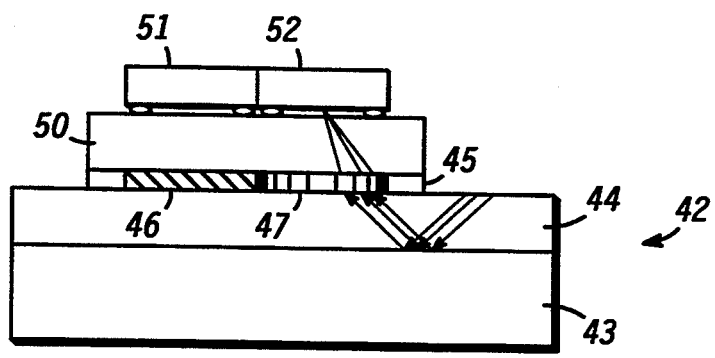
FIG. 3 illustrates diagramatically an I/O node in an optical channel waveguide including apparatus for utilizing the node, embodying the present invention.
Figure 4:
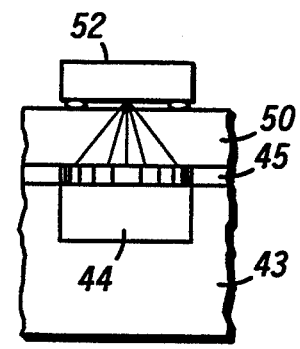
FIG. 4 is a view in end elevation of the node and apparatus illustrated in FIG. 3.

FIG. 3 illustrates diagramatically an I/O node 40 in an optical channel waveguide including apparatus for utilizing node 40, constructed in accordance with the present methods. FIG. 4 is a view in end elevation of node 40 and the apparatus illustrated in FIG. 3. Node 40 includes a molded optical channel waveguide 42 with a molded first cladding layer 43 filled with an optically transparent material 44 forming the core. A layer 45 of transmissive holographic material is affixed in overlying relationship to the upper surface of waveguide 42. The transmissive holographic material of layer 45 can include photopolymer recording film of a type which may be purchased from, for example, DuPont De Nemours, Inc. under the trademark OraniDex, film 600 or film 610, a layer of dichromated gelatin (commonly known as DCG) or, in a somewhat different embodiment, a blazed dielectric grating can be used. Layer 45 has a first area 46 with two pluralities of gratings formed therein overlying an exposed area of waveguide 42. The gratings in area 46 are formed, as explained in conjunction with node 25 of FIG. 2, so that light rays directed onto the upper surface thereof are launched into waveguide 42 in both directions.

A second area 47 has gratings formed therein to allow some light rays travelling along waveguide 42 (within optically transparent material 44) to be diffracted out of waveguide 42. The amount of light diffracted out of waveguide 42 is essentially only a small sample of the total light in waveguide 42. A layer 50 of optically transparent material is affixed in overlying relationship on holographic layer 45. Layer 50 operates as a substrate for electronic components and electrical connections thereto. In some applications it may be possible to mount electronic components directly onto holographic layer 45 but any heat or other strain developed during the mounting process could damage holographic layer 45 and reduce the operating efficiency.

In this specific embodiment, a light generator 51 is mounted on an upper surface of layer 50 so as to direct generated light through layer 50 and in a substantially normal orientation onto area 46. Substantially all of the light generated by light generator 51 is launched into the core of waveguide 42. Light generator 51 is any of the well known electronic devices, such as vertical cavity surface emitting lasers, light emitting diodes, etc. A light detector 52 is mounted on the upper surface of layer 50 so as to receive light from area 47. Area 47 is formed generally in the shape of a Fresnel lens superimposed on gratings of the type in area 46 so that light emanating from the core of waveguide 42 is substantially focused onto a light input of light detector 52. Thus, light generated by light generator 51 is launched into waveguide 42 and travels both ways therein (or one way if the embodiment of FIG. 1 is utilized) and a sample of light travelling within the core of waveguide 42 emanates out through area 47 where it is focused onto light detector 52. Thus, I/O node 40 is a relatively efficient light input node and, because of the small sample of light removed, it operates similar to a high impedance output node in an electrical bus.

In a specific embodiment, light generator 51 and light detector 52 are mounted on layer 50, by bump soldering, conductive epoxy, or any other convenient means, and external electrical connections are provided. Layer 50 is then affixed to layer 45 by some convenient means, such as a polymer adhesive similar to optically transparent material 15 in FIG. 1. Layer 50 can be properly oriented over layer 45 by any of the well known techniques utilized in the semiconductor industry. While light generator 51 in conjunction with area 46 and light detector 52 in conjunction with area 47 are illustrated adjacent each other, it will be understood by those skilled in the art that only one or the other of the electronic components and associated areas might be utilized in specific applications, pluralities of either or both of the electronic components and associated areas might be utilized, and/or the electronic components and associated areas might be separated by a predetermined amount of space.

Referring to FIGS. 5 and 6, an embodiment of an optical bus 55 incorporating a plurality of I/O nodes and associated apparatus, formed in accordance with the present method, are illustrated in top plan and side elevation, respectively. Bus 55 is formed on a molded first cladding layer 56 including a plurality of channels filled with optically transparent material to form a plurality of optical channel waveguides 57. In this illustration only five optical channel waveguides 57 are utilized for simplicity, but it should be understood that any convenient number, such as eight (for eight bit digital signals) could be utilized. A layer 58 of holographic material is affixed in overlying relationship to an exposed area in the upper surface of each waveguide 57. Holographic layer 58 includes gratings therein, similar to those described in conjunction with FIGS. 3 and 4, associated with each waveguide 57.

A second substrate or layer 59 of optically transparent material has a plurality or array of pairs of light generators 61 and light detectors 62 mounted on the upper surface thereof. Electrical connections 63 to each of the light generators 61 and light detectors 62 are formed in optically transparent material by any convenient means, such as metal deposition, embedded flexible leads, etc. In this specific embodiment, connections 63 extend to an edge of transparent material 59 and each pair terminate in an external connecting pad 64. As explained previously, layer 59, after all of the mounting and electrical connections have been accomplished, is affixed to the upper surface of layer 58 so that light generators 61 and light detectors 62 are properly positioned over the appropriate gratings. Thus, the I/O nodes associated with optical bus 55 form an optical to electrical terminal and an electrical to optical terminal for the plurality of waveguides 57. Because the light can be launched and picked off from either one or both directions in waveguides 57, the terminals can be located anywhere along waveguides 57.

FIG. 7 illustrates bus 55 with the I/O nodes and associated electronic components, in the form of one type of complete package. In this embodiment conventional overmolding is utilized to encapsulate the components. Alignment pins, or mating alignment openings, are formed in one end of the package so that waveguides 57 will be optically aligned with similar waveguides in a mating structure. Also, external leads 71 are attached at one end to external mounting pads 64, prior to overmolding, so that a complete plug-in package is provided.

Figure 8:
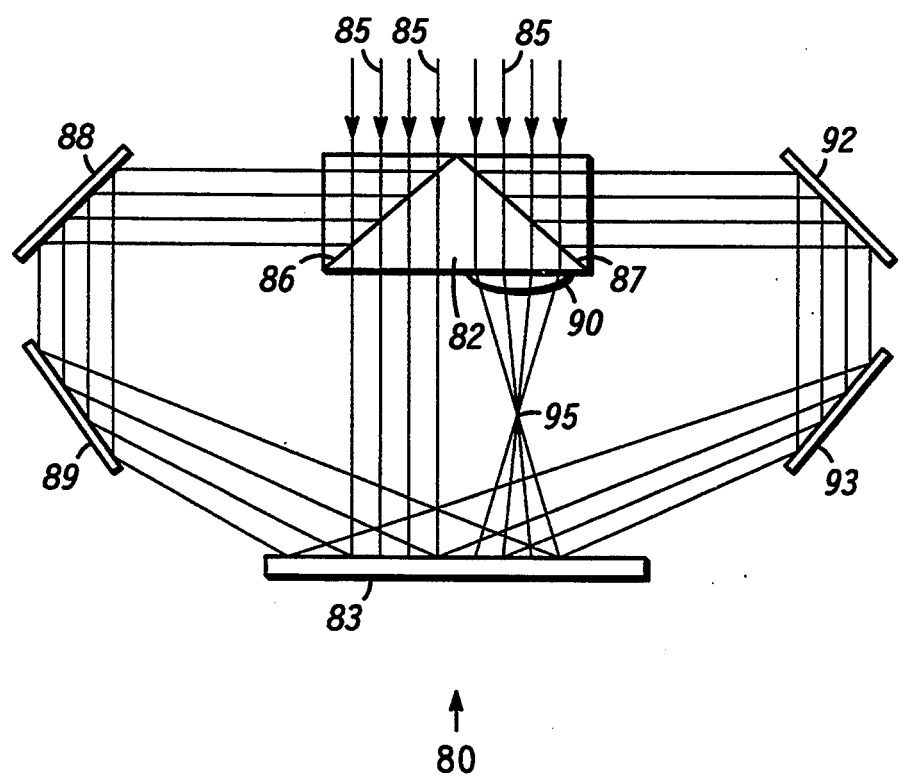
FIG. 8 is a ray diagram of apparatus utilized in the manufacture of the I/O nodes of FIG. 3.

FIG. 8 illustrates a ray diagram of apparatus 80 utilized in the manufacture of the I/O nodes of FIG. 2 and/or FIG. 3. Apparatus 80 includes two oppositely directed 50/50 beam splitters 82 positioned directly above a layer 83 of holographic material in which it is desired to form gratings. In this embodiment, layer 83 is a holographic layer of unexposed photopolymer recording film of a type which may be purchased from, for example, DuPont De Nemours, Inc. under the trademark OmniDex, film 600 or film 610. A layer of dichromated gelatin (commonly known as DCG) can be utilized instead of the photopolymer recording film but requires some wet processing.

A beam 85 of collimated light from a source, such as a laser or the like is directed onto the upper surface of beam splitter 82. Generally, beam 85 is from a single frequency light source, such as an argon laser, to provide a desired interference pattern, as will be explained. Beam splitter 82 is formed of an isosceles triangle positioned so that approximately one half of beam 85 impinges on one upper side 86 and the other half of beam 85 impinges on a second side 87. The half of beam 85 that impinges upon side 86 of beam splitter 82 is split and a portion travels through beam splitter 82 directly to layer 83 while the remainder is simultaneously reflected to a first mirror 88. Mirror 88 reflects the beam onto a second mirror 89, which then reflects the beam onto layer 83 to form an interference pattern with the portion of the beam travelling directly through beam splitter 82 as well as part of the beam reflected from mirror 93. The interference pattern exposes layer 83 to different intensities of light and the index of refraction of layer 83 differs in accordance with the intensity of light to which it is exposed. Thus, gratings are formed by the different indexes of refraction. The angle at which the direct and reflected beams strike the surface of layer 83 determines the angle of the gratings that are formed in layer 83.

The half of beam 85 that impinges upon side 87 of beam splitter 82 is split and a portion travels through beam splitter 82, and a lens 90 affixed to the bottom thereof, directly to layer 83 while the remainder is simultaneously reflected to a first mirror 92. Mirror 92 reflects the beam onto a second mirror 93, which then reflects the beam onto layer 83 to form an interference pattern with the portion of the beam travelling directly through beam splitter 82 and lens 90 as well as part of the beam reflected from mirror 89. The portion of the beam passing through lens 90 crosses at a point 95 midway between lens 90 and layer 83. The interference pattern exposes layer 83 to different intensities of light and the index of refraction of layer 83 differs in accordance with the intensity of light to which it is exposed. Thus, a second plurality of gratings are formed by the different indexes of refraction, which second plurality of gratings is generally in the form of a Fresnel lens. The Fresnel lens formed in layer 83 focuses light passing through layer 83 from the bottom toward the upper surface generally at point 95. Here it should be noted that single gratings (for directing light only one way in an optical waveguide) are formed by limiting the extent of the light from mirror 93 (or in mirror 89) so as to form interference patterns only with the portion of the beam travelling directly through side 87 (or 86) of beam splitter 82.

In instances where the gratings in layer 83 must form a large angle with the perpendicular to layer 83 (to satify core and cladding index of refraction requirements), the beam reflected from mirror 89 onto the surface of layer 83 and the beam reflected from mirror 93 onto the surface of layer 83 are at such an angle that the light is reflected from the surface, rather than producing an interference pattern within layer 83. For small core/cladding index of refraction differences in the waveguides, it may be necessary to attach a special prism structure to photopolymer layer 83, with appropriate index matching fluid, to achieve the desired angles between the interfering beams inside photopolymer layer 83.

Once layer 83 is properly exposed to form the desired gratings therein, layer 83 is fixed (polymerized), in the case of holographic recording film, by exposing it to ultraviolet light for a required period of time. This entire process, and especially if holographic recording film is utilized, lends itself very well to assembly line techniques. That is, continuous rolls of holographic recording film are passed through an exposure station, a polymerization station, a cutting station, etc., and then rerolled, or otherwise packaged for later use in an assembly line for manufacturing packages as described in conjunction with FIG. 7.

Thus, improved apparatus for introducing and/or extracting light waves from optical channel waveguides and methods of manufacturing the apparatus are disclosed. Further, new and improved apparatus utilizing I/O nodes for molded optical channel waveguides is disclosed. Also, new and improved apparatus utilizing I/O nodes for optical channel waveguides is disclosed which is relatively simple and inexpensive to manufacture and use. The apparatus for extracting light from optical channel waveguides is essentially a sampling apparatus that samples the light in the waveguide core without substantially effecting the majority of the light, similar to a high impedance node in an electronic bus. Additionally, new and improved apparatus utilizing I/O nodes for optical channel waveguides is disclosed which is particularly adaptable to backplane and other buses in high speed electronic equipment.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A method of manufacturing an input/output node in an optical channel waveguide comprising the steps of:
   providing a first cladding layer having a first index of refraction;
   forming a channel in a surface of the first cladding layer;
   filling the channel with an optically transparent polymer having a second index of refraction at least 0.01 greater than the first index of refraction, the optically transparent polymer in the channel forming an optical waveguide having a critical internal reflection angle;
   forming, from a holographic material having an index of refraction substantially similar to the second index of refraction, a holographic layer with first and second substantially parallel, spaced apart optical input/output surfaces,
   forming in the holographic layer a plurality of gratings which extend substantially between the first and second optical input/output surfaces of the holographic layer, the plurality of gratings being positioned to form a predetermined angle with the first and second optical input/output surfaces of the holographic layer such that light rays incident on the second optical input/output surface of the holographic layer and substantially normal thereto are diffracted by the gratings at an angle, with a transverse axis of the holographic layer, greater than the critical angle of the optical waveguide; and
   affixing the holographic layer to the surface of the first cladding layer with the first optical input/output surface overlying an exposed surface of the optically transparent polymer.

2. A method of manufacturing an input/output node in an optical channel waveguide as claimed in claim 1 wherein the steps of providing a first cladding layer having a first index of refraction and forming a channel in a surface of the first cladding layer are performed by molding the first cladding layer with the channel.

3. A method of manufacturing an input/output node in an optical channel waveguide as claimed in claim 1 wherein the step of forming in the holographic layer a plurality of gratings includes the steps of
   providing the holographic layer of uncured holographic material,
   exposing the uncured holographic layer to a pattern of light and dark areas directed at the predetermined angle to form the plurality of gratings by different indexes of refraction within the holographic layer, and
   curing the holographic layer to fix the gratings therein.

4. A method of manufacturing an input/output node in an optical channel waveguide as claimed in claim 3 wherein the step of providing the holographic layer of uncured holographic material includes providing a photopolymer recording film and the step of curing the holographic layer to fix the gratings therein includes subjecting the holographic film to ultraviolet light.

5. A method of manufacturing an input/output node in an optical channel waveguide as claimed in claim 3 wherein the step of exposing the uncured holographic layer includes directing two light beams at the holographic layer so as to produce an interference pattern on a surface of the holographic layer.

6. A method of manufacturing an input/output node in an optical channel waveguide as claimed in claim 5 wherein the step of exposing the uncured holographic material by directing two light beams at the holographic layer so as to produce an interference pattern on a surface of the holographic layer includes providing an optical beam splitter, directing a collimated light beam onto the beam splitter to form two reflected beams and two direct beams of light and reflecting the reflected beams onto the holographic layer to form two interference patterns in conjunction with the two direct beams.

7. A method of manufacturing an input/output node in an optical channel waveguide as claimed in claim 6 wherein the step of providing the optical beam splitter includes providing a lens in one of the two direct beams to produce a holographic lens in the holographic layer and positioned to focus light rays passing therethrough from the first surface of the holographic layer onto a predetermined external spot.

8. A method of manufacturing an input/output node in an optical channel waveguide as claimed in claim 1 including in addition the steps of affixing a layer of optically transparent material to the second surface of the holographic layer and mounting an electronic device including at least one of a light generator and a light detector on the optically transparent layer in optical communication with the optical waveguide through the holographic layer.

9. An input/output node in an optical channel waveguide and apparatus utilizing the node comprising:
- a molded cladding layer having a first index of refraction and a channel formed therein;
- optically transparent material having a second index of refraction at least 0.01 greater than the first index of refraction and positioned in the channel of the cladding layer so as to form an optical channel waveguide having a critical internal reflection angle, the optical channel waveguide having an exposed surface;
- a holographic layer having an index of refraction substantially similar to the second index of refraction, the holographic layer being formed with first and second substantially parallel, spaced apart optical input/output surfaces, the holographic layer having a plurality of gratings formed therein so as to substantially extend between the first and second optical input/output surfaces of the holographic layer, and the first optical input/output surface being affixed in overlying relationship to the exposed surface of the optical channel waveguide;
- the plurality of gratings being positioned to form an angle with the first and second optical input/output surfaces of the holographic layer such that light rays incident on the second optical input/output surface of the holographic layer and substantially normal thereto are diffracted by the gratings into the optical waveguide at an angle, with a transverse axis of the optical channel waveguide, greater than the critical angle of the optical channel waveguide;
- an optically transparent layer of material affixed to the second optical input/output surface of the holographic layer; and
- an electronic device including at least one of a light generator and a light detector fixedly mounted on the optically transparent layer in optical communication with the optical channel waveguide.

10. An input/output node in an optical channel waveguide as claimed in claim 9 wherein the plurality of gratings are positioned to reflect light rays incident on the second input/output optical surface of the holographic layer into the optical waveguide in two opposite directions.

11. An input/output node in an optical channel waveguide as claimed in claim 9 wherein the plurality of gratings are formed by different indexes of refraction within the holographic layer.

12. An input/output node in an optical channel waveguide as claimed in claim 9 wherein the holographic layer includes photopolymer recording film.

13. An input/output node in an optical channel waveguide as claimed in claim 9 wherein the holographic layer includes dichromated gelatin.

14. An input/output node in an optical channel waveguide as claimed in claim 9 wherein the holographic layer includes a holographic lens positioned to focus light rays from within the optical waveguide onto a predetermined external spot.

15. An input/output node in an optical channel waveguide as claimed in claim 9 including in addition a light generator mounted adjacent the holographic layer and directing generated light rays onto the second optical input/output surface of the holographic layer and substantially normal thereto when the light generator is activated.

16. An input/output node in an optical channel waveguide as claimed in claim 15 wherein the light generator is a vertical cavity surface emitting laser.

17. An input/output node in an optical channel waveguide as claimed in claim 15 wherein the light generator is a light emitting diode.

18. An input/output node in an optical channel waveguide comprising:
- an optical channel waveguide including molded surrounding cladding layers with a channel molded therein to define a channel waveguide core having a predetermined index of refraction with a critical internal reflection angle, the waveguide core extending continuously from a first end to a second end and including an exposed side surface positioned intermediate the first and second ends;
- a transmissive holographic layer with first and second substantially parallel, spaced apart optical input/output surfaces, the holographic layer having a plurality of gratings formed therein so as to substantially extend between the first and second optical input/output surfaces of the holographic layer, and the first optical input/output surface being affixed in overlying relationship to the exposed side surface of the optical channel waveguide core; and
- the plurality of gratings being positioned to form an angle with the first and second optical input/output surfaces of the holographic layer such that light rays incident on the second optical input/output surface of the holographic layer and substantially normal thereto are diffracted by the gratings into the optical waveguide core.

19. An input/output node in an optical channel waveguide as claimed in claim 18 wherein the incident light rays are diffracted by the gratings into the optical channel waveguide core at an angle, with a transverse axis of the waveguide, greater than the critical angle of the optical channel waveguide core.

20. An input/output node in an optical channel waveguide as claimed in claim 18 including in addition a light detector mounted adjacent the holographic layer so as to receive light rays emanating from the second optical input/output surface of the holographic layer.

21. An input/output node in an optical channel waveguide as claimed in claim 18 wherein the holographic layer includes optically transparent materials having an index of refraction substantially similar to the index of refraction of the optical waveguide core.

22. An input/output node in an optical channel waveguide comprising:
- an optical channel waveguide including molded surrounding cladding layers with a channel molded therein to define a channel waveguide core and the waveguide core having a predetermined index of refraction with a critical internal reflection angle and an exposed side surface;
- a transmissive holographic layer with first and second substantially parallel, spaced apart optical input/output surfaces, the holographic layer having a plurality of gratings formed therein so as to substantially extend between the first and second optical input/output surfaces of the holographic layer, and the first optical input/output surface being affixed in overlying relationship to the exposed side surface of the optical channel waveguide core;

the plurality of gratings being positioned to form an angle with the first and second optical input/output surfaces of the holographic layer such that light rays incident on the second optical input/output surface of the holographic layer and substantially normal thereto are diffracted by the gratings into the optical waveguide core; and an optically transparent layer of material affixed to the second optical input/output surface of the holographic layer and having a light generator fixedly mounted thereon.

23. An input/output node in an optical channel waveguide as claimed in claim 22 wherein the optically transparent layer additionally has a light detector fixedly mounted thereon so as to receive light rays emanating from the second optical input/output surface of the holographic layer.

* * * * *